(12) United States Patent
Duval

(10) Patent No.: US 11,561,788 B2
(45) Date of Patent: Jan. 24, 2023

(54) RESILIENT SOFTWARE UPDATES IN SECURE STORAGE DEVICES

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/390,626

(22) Filed: Jul. 30, 2021

(65) Prior Publication Data

US 2021/0357203 A1    Nov. 18, 2021

Related U.S. Application Data

(63) Continuation of application No. 16/694,583, filed on Nov. 25, 2019, now Pat. No. 11,080,039.

(51) Int. Cl.
*G06F 8/65* (2018.01)
*G06F 9/4401* (2018.01)

(52) U.S. Cl.
CPC .............. *G06F 8/65* (2013.01); *G06F 9/4401* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 10,108,413 B2 | 10/2018 | Gilbert et al. | |
| 10,275,598 B2 | 4/2019 | Zimmer et al. | |
| 11,080,039 B2 | 8/2021 | Duval | |
| 2013/0263205 A1* | 10/2013 | Jacobs | G06F 21/57 726/1 |
| 2017/0010875 A1 | 1/2017 | Martinez et al. | |
| 2018/0322012 A1 | 11/2018 | Sharma et al. | |
| 2018/0330093 A1* | 11/2018 | Shivanna | G06F 21/575 |
| 2019/0243630 A1 | 8/2019 | England | |
| 2019/0250900 A1 | 8/2019 | Troia et al. | |
| 2020/0364340 A1* | 11/2020 | Khoruzhenko | H04W 12/12 |
| 2021/0157563 A1 | 5/2021 | Duval | |

FOREIGN PATENT DOCUMENTS

CN    102830984    12/2012

OTHER PUBLICATIONS

International Search Report and Written Opinion, PCT/US2020/061310, dated Mar. 9, 2021.

* cited by examiner

*Primary Examiner* — Jae U Jeon
(74) *Attorney, Agent, or Firm* — Greenberg Traurig

(57) ABSTRACT

Disclosed herein are methods, computer readable media, and devices for performing software updates. In one embodiment, a method is disclosed comprising initializing a storage space of a secure storage device into a plurality of portions; copying an update program to a first portion in the portions and copying update data to a second portion of the portions; generating a first golden measurement for the first portion and a second golden measurement for the second portion; measuring the first portion; updating or rolling back an update to the secure device in response to determining that the measuring of the first portion does not match the first golden measurement of the first portion; and verifying an update operation upon determining that the measuring of the first portion matches the first golden measurement of the first portion.

20 Claims, 7 Drawing Sheets

RESILIENT SOFTWARE UPDATES IN SECURE STORAGE DEVICES

RELATED APPLICATIONS

The present application is a continuation application of U.S. patent application Ser. No. 16/694,583, filed Nov. 25, 2019, issued as U.S. Pat. No. 11,080,039 on Aug. 3, 2021, and entitled "Resilient Software Updates in Secure Storage Devices," the entire disclosure of which application is hereby incorporated herein by reference.

COPYRIGHT NOTICE

A portion of the disclosure of this patent document contains material which is subject to copyright protection. The copyright owner has no objection to the facsimile reproduction by anyone of the patent document and the patent disclosure, as it appears in the Patent and Trademark Office patent files or records, but otherwise reserves all copyright rights whatsoever.

BACKGROUND

The disclosed embodiments are directed toward software updates in secure storage device. Specifically, the disclosed embodiments are directed toward providing reliable and resilient updates in potentially variable environments for such secure storage devices.

In many environments, secure storage devices are frequently updated under conditions where failures to update the storage device software must be either avoided or gracefully handled. For instance, a software update to an operating system of an autonomous vehicle may be installed while the vehicle is in motion. Failures in the software update process could potentially cause hardware systems of the vehicle to become unresponsive which could potentially result in a collision.

Currently, many update procedures of secure storage devices effectively require the storage devices to be placed in a special mode or require that the secure storage device be in a specific environment prior to executing the software update. This requirement ensures that any failures in the software update process will not negatively impact the user of the device or components relying on the device.

This current procedure unnecessarily limits the frequency of software updates and negatively impacts user experience of systems using such storage devices. As such, there exists a need in the art for an improved secure storage device that supports anytime software updates in a reliable and resilient manner. The disclosed embodiments provide such a technical solution.

DETAILED DESCRIPTION

Figure 1:
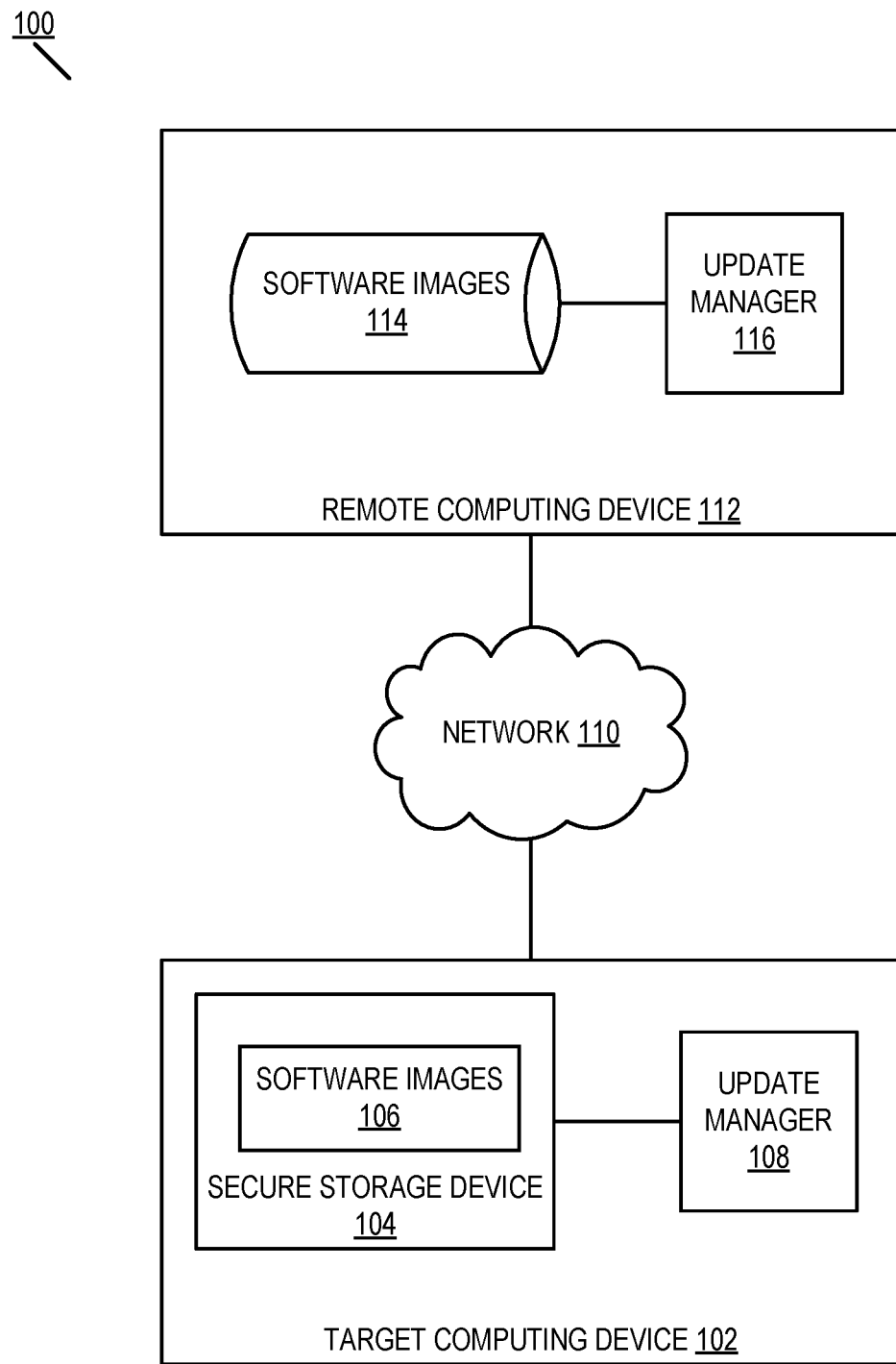
FIG. 1 is a block diagram illustrating a computer system for managing software updates according to some embodiments of the disclosure.

The disclosed embodiments describe techniques for enabling modifications to any portion of a software image stored on a secure storage device without compromising the execution of the software image. The disclosed embodiments solve the problems above by enabling software updates to be more resilient across power cycles, thus preventing the corruption of device software. In doing so, the disclosed embodiments allow for software updates to be performed on critical portions of computer systems with little to no risk, greatly reducing the costs and computational complexity of software updates that would otherwise need to be implemented in severely constrained conditions.

The techniques include a software update sequence that begins at a first point in time, may be interrupted by an event, and can either revert or resume the software update at a later time (even after a reboot). In another aspect, the disclosed embodiments may only allow a privileged user to control the initiation and configuration of the aforementioned software update sequence. Additionally, in another aspect, the disclosed embodiments support multiple types of software update schemes including A/B (full image) software updates and differential (partial) software updates.

In the embodiments described herein, the software update may comprise a boot program. In these embodiments, any malfunction of the update process could render the device inoperative (i.e., "brick" the device) and render the device unable to boot. Examples of malfunctions include power loses, communications link interruptions, and malicious actor intervention. The disclosed embodiments reduce the risks associated with these malfunctions by leveraging features of the secure storage device. Specifically, the disclosed embodiments utilize the concept of a privileged user to prevent unauthorized users from initiating software update procedures. Additionally, the disclosed embodiments provide a state-tracking feature that enables the secure storage device to maintain a system state across boot sequences that allows the secure storage device to revert the system to its previous state or resume an update sequence.

As described above, the disclosed embodiments support full updates and partial updates. If a full image update scheme is implemented, a previous software image on the secure device can be saved until a new image is ready to be installed, then a boot pointer can be assigned to the new image as the active image. In existing systems, however, there is still a risk that the pointer change operation could fail—bricking the device. The disclosed embodiments solve this problem as described in more detail herein.

If the new image is large and the changes introduced in the new image are comparatively smaller, then the full image update unnecessarily consumes a large amount of the communications payload and a large-sized buffer space on the storage device. Differential updates reduce the size of communications and buffer utilization in such a scenario. However, additional complexity is added during the update procedure due to the "piecemeal" nature of such an update. This complexity adds additional points of failure which are also addressed by the disclosed embodiments.

FIG. 1 is a block diagram illustrating a computer system for managing software updates according to some embodiments of the disclosure.

In the illustrated embodiment, a system (100) includes a remote computing device (112) and a target computing device (102) communicatively connected via a network (110). Although illustrated singularly, the system (100) may include multiple devices (112, 102) and may communicate over multiple networks. In the illustrated embodiment, the devices (102, 112) comprising computing devices such as that illustrated in FIG. 7. For example, remote computing device (112) may comprise one or more server computers and the target computing device (102) may comprise a consumer computing device. In some embodiments, the target computing device (102) may comprise an in-vehicle electronic control unit (ECU) or other device. In other embodiments, the target computing device (102) may comprise a laptop, desktop, mobile, wearable, or other consumer computing device. In other embodiments, the target computing device (102) itself may comprise a server or other network device. The present disclosure places no limits on the type and usage of the devices (102, 112).

In the illustrated embodiment, the remote computing device (112) includes a software image storage device (114) and an update manager (116). In one embodiment, the software image storage device (114) is external to the remote computing device (112). In some embodiments, the software image storage device (114) includes a filesystem that stores software images. In other embodiments, the software image storage device (114) includes a database that stores the software images. In these embodiments, the database can comprise a relational, NoSQL, key-value, or any other type of database for storing files. In the illustrated embodiment, a software image refers to a file that defines a piece of software. In some embodiments, a software image refers to a source code image of a replacement piece of software, designed to replace a previous version of the software. In other embodiments, a software image refers to a partial update. A partial update comprises an update to a piece of software, the update comprising less than the entire piece of software. In some embodiments, the software image storage device (114) stores both full and partial software images. The software images may take the form of human-readable source code or machine-readable binary (compiled) code. The present disclosure places no limits on the specific data format of the software image. Software images are generally managed by the operator of the remote computing device (112). As updates to software are created in the form of software images, an operator uploads the software images to the software image storage device (114). Other techniques may be used to insert software images into the software image storage device (114) such as version control systems (e.g., git), continuous integration systems, or other systems.

The remote computing device (112) additionally includes an update manager (116). In some embodiments, the update manager (116) and software image storage device (114) can be implemented on a single device (e.g., as a database and an application server, respectively). In other embodiments, the update manager (116) comprises a standalone computing device (e.g., server). As illustrated, the update manager (116) accesses the software image storage device (114). In the illustrated embodiment, the update manager (116) retrieves software images from the software image storage device (114). In some embodiments, the update manager (116) retrieves software images from the software image storage device (114) in response to a request for updates from the target computing device (102). Alternatively, or in conjunction with the foregoing, the update manager (116) can periodically check for new software images stored in the software image storage device (114) and retrieve the software images in response to detecting new ones. Alternatively, or in conjunction with the foregoing, the update manager (116) can subscribe to the software image storage device (114) and the software image storage device (114) can push software images to the update manager (116) when newly stored in the software image storage device (114). The specific mechanism in which the update manager obtains software images is not intended to be limiting.

In the illustrated embodiment, the update manager (116) performs various operations with respect to certain images. For example, the update manager (116) can be configured to perform a checksum verification on the software image to ensure the integrity of the software image. In other embodiments, the update manager (116) assumes the integrity of the software image and generates a checksum (e.g., MD5) for the software image to be used by other devices. Primarily, however, the update manager (116) is responsible for coordinating the transfer of software images from the remote computing device (112) to the target computing device (102). This role has been described previously and is not repeated herein.

The remote computing device (112) transfers software images to the target computing device (102) over one or more networks (110). In the illustrated embodiment, the network (110) comprises an internet (a network of networks). In this embodiment, the network (110) comprises a wide area network (WAN), however other network types may be utilized in lieu of any specifically described networks.

The target computing device (102) receives the software images over the network (110). Specifically, the target computing device (102) receives software images via a corresponding update manager (108). The update manager (108) is configured to process received software images and load the software images (106) into the secure storage device (104). In the illustrated embodiment, the update manager (108) can be implemented in software or via dedicated hardware. Specific operations of the update manager (108) are described in more detail in the description of FIGS. 2 through 6 and that description is incorporated herein by reference in its entirety.

In the illustrated embodiment, secure storage device (104) comprises a storage device (e.g., Flash-based, magnetic disk-based, etc.) as well as a secure platform module (SPM). In some embodiments, this secure platform module can comprise a module conforming to the ISO/IEC 11889 standard and may comprise a Trusted Platform Module. The specific standard used is not limiting. In general, the secure storage device (104) is configured to not only store software images but verify the integrity of the underlying storage media. The SPM may include features such as random number generation, cryptographic key generation functions, encryption/decryption functions, attestation functions, and other secure functions. In some embodiments, the SPM can alternatively be implemented as part of the update manager (108).

In the illustrated embodiment, the secure storage device (104) can be segmented into multiple portions. These portions may be configured with various properties that enable and disable writing by unauthorized users. The secure storage device (104) will usually include a portion referred to as the "active software space" which stores a current software image. In addition to an active storage space, the secure storage device (104) can include a hidden storage portion.

Reference is now made to FIGS. 2 through 5 which describe the processes the system employs to securely update a software image.

Figure 2:
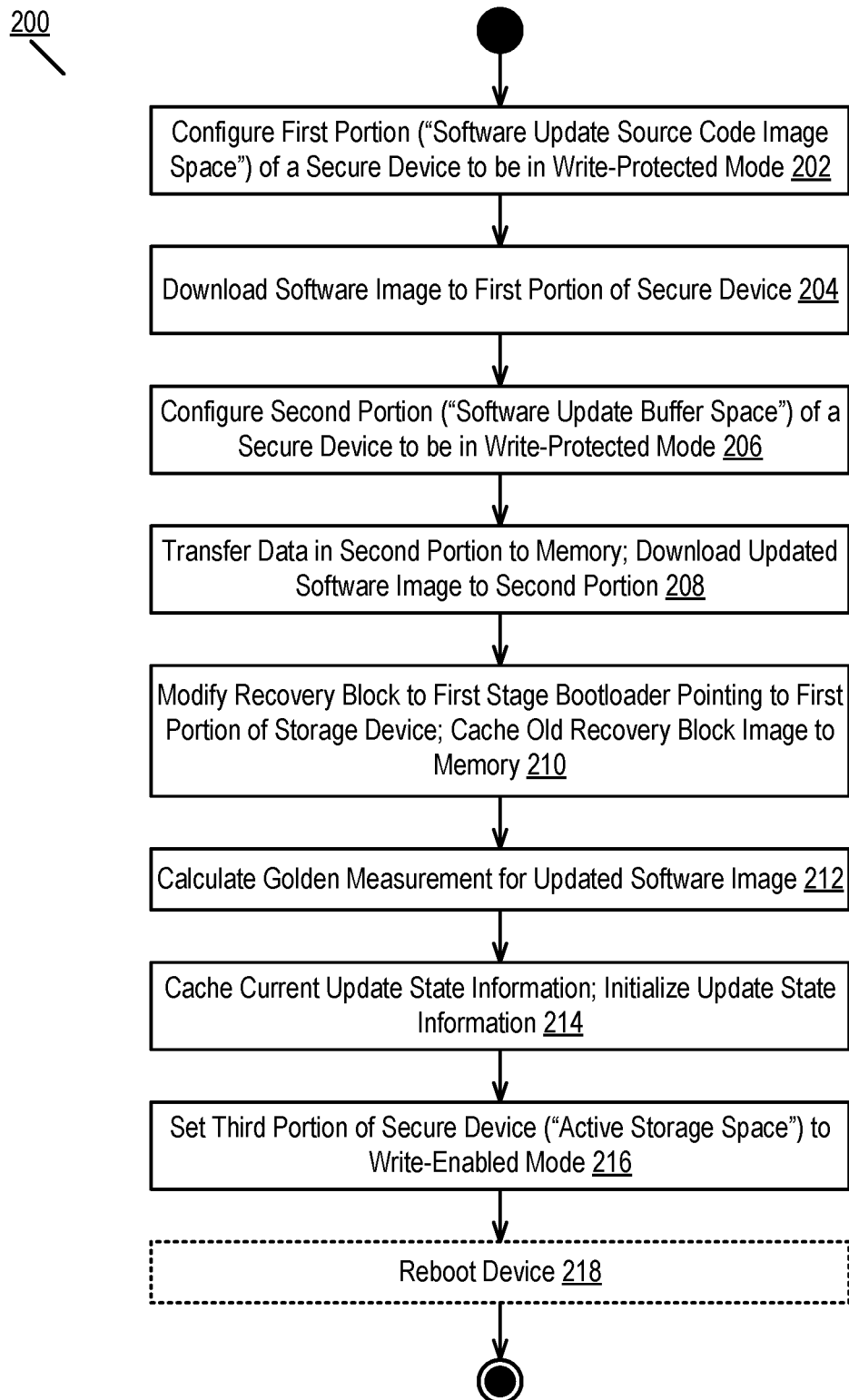
FIG. 2 is a flow diagram illustrating a method for initializing a secure storage device for a software update according to some embodiments of the disclosure.

FIG. 2 is a flow diagram illustrating a method for initializing a secure storage device for a software update according to some embodiments of the disclosure. Prior to executing the method depicted in FIG. 2, a device executing method includes a first software image (referred to as image A) and has not begun executing any software update steps. The illustrated method prepares the images for updating the device and then reboots the device to start or resume the update procedure. In the illustrated embodiment, the method (200) is performed by a privileged user of the device (including a remote privileged user).

In block 202, the method (200) configures a first portion of a secure storage device to operate in a write-protected mode. This first portion is also referred to as the "software update source code image space." In the illustrated embodiment, the method (200) is operated by a privileged user of the storage space. With reference to FIG. 1, this privileged user can comprise the update manager (108). For the sake of certainty, a privileged "user" refers to a user account on the target computing system (e.g., 102) and does not refer to a human user. Thus, a privileged user may comprise a software application executing under a privileged user account. In the illustrated embodiment, then the first portion is set to write-protected, only a privileged user can write to that first portion, all other user accounts are blocked from writing to the first portion.

In block 204, the method (200) downloads a software image to the first portion configured in block 202. As described previously, the method (200) may retrieve a software image from a remote repository over a network. In response to receiving the software image, the method (200) copies or otherwise transfers the image to the write-protected first portion configured in block 202. In the illustrated embodiment, the first portion stores the source code for a program that executes a software update. In general, this may include a first-stage bootloader (FSBL) and system code for managing the update procedure.

In some embodiments, in block 204, the method (200) simultaneously saves the existing content of the first portion into memory. That is, prior to executing block 204, the method (200) copies the current contents of the first portion into memory before writing the new software image to the first portion. In some embodiments, the current contents of the first portion comprise the code for installing the current version of the software installed on the device.

In block 206, the method (200) configures a second portion of a secure storage device to operate in a write-protected mode. This first portion is also referred to as the "software update buffer space." The creation of a second portion of the secure storage device as a write-protected portion can be performed as described in the description of block 202.

In block 208, the method (200) transfers the data in the second portion to memory and downloads an updated software image to a second portion. In the illustrated embodiment, the transfer of data from the second portion to memory is performed similar to that described previously in the description of block 204. In the illustrated embodiment, the data stored in the second portion comprises the actual update data used to update the software on the device. In some embodiments, an entire update image is downloaded while in others only partial update data is downloaded.

In block 210, the method (200) modifies a recovery block of the secure storage device to point to the first portion created in block 202. The method (200) also caches the recovery block in memory. By executing block 210, the method ensures that the update procedure is updated on every reboot until completed. The previous recovery block is cached to enable restoration of normal operations upon completion of the update procedure.

In the illustrated embodiment, a recovery block refers to the first block of the secure storage device executed upon boot, before a FSBL is executed. In general, the recovery block includes memory detection code as well as low-level disk validation and recovery code. In block 210, the method (200) overwrites this recovery block to point instead to a FSBL that loads the software image written to the first portion. In general, a FSBL is a suitably small program configured to setup memory segments, reset the disk, locate a second-stage bootloader (i.e., the first portion), read the second-stage bootloader (i.e., first portion) into memory and transfer control to the second-stage bootloader (i.e., first portion). In the illustrated embodiment, the FSBL comprises the FSBL responsible for loading and starting the update procedure that is loaded in the first portion.

In block 212, the method (200) calculates a new golden measurement for the updated software image downloaded in previous blocks. As used herein, a golden measurement refers to any value that can be used to securely identify a piece of software. Generally, a golden measurement is generated using one or more cryptographic functions. For example, a hash of a piece of software can be used as the golden measurement. In other embodiments, the golden measurement can comprise a hash tree of the updated software image. This golden measurement forms a root of trust in that it can be used to verify that other software matches the expected format and value.

In the illustrated embodiment, the golden measurement comprises a two-part measurement. The first measurement comprises a hash of the first stage bootloader loaded in the first portion. The second golden measurement comprises hash of the entire update image stored in the second portion. In some embodiments, the hashes can also include a secret key stored in the device and may comprise a hash-based message authentication code (HMAC) of the underlying data In the illustrated embodiment, the method (200) additionally caches the existing golden measurements computed for the first and second portions. This effectively caches the golden measurements for the current state of the system.

In block 214, the method (200) caches the current update state information of the secure storage device and initializes new update state information to an initial state. As used herein, a "state" refers to the operational state of the secure storage device. These states define the current operational status of a given device. As used herein, an initial state refers to one or more values configured to indicate that the secure storage device is in a state requiring initialization. In one embodiment, part of the initialization comprises establishing a new root of trust using a golden measurement and, in the illustrated embodiment, the golden measurement calculated in block 212.

In block 216, the method (200) configures a third portion of the secure storage device to be in write-enabled mode. This third portion is also referred to as the "active storage space." As described above, the third portion includes the currently operative software image to be updated (referred to as image A). By setting the third portion as write-enabled, the method (200) allows any user (or a subset of users) to write data to the active storage space.

Thus, after the execution of block 216, the secure storage device is configured with three separate portions: a write-protected first portion and second portion stored in a hidden part of the storage medium and a third write-enabled portion storing the active software image in use. The method (200) additionally modifies the booting preference of the secure storage device to boot off of the first portion that includes an updated software image. A copy of the new software image is additionally stored within the second portion.

In block 218, after re-configuring the secure storage device portions and modifying the boot process, the method (200) reboots the device. In the illustrated embodiment, the reboot comprises a software-initiated reboot. In some embodiments, the method (200) may force the secure storage device to reboot. After rebooting, the method (200) ends and may be followed by the method described in FIG. 3.

In some embodiments, the rebooting in block 218 ensures additional security. In other embodiments, the method (200) may forego rebooting.

Figure 3:
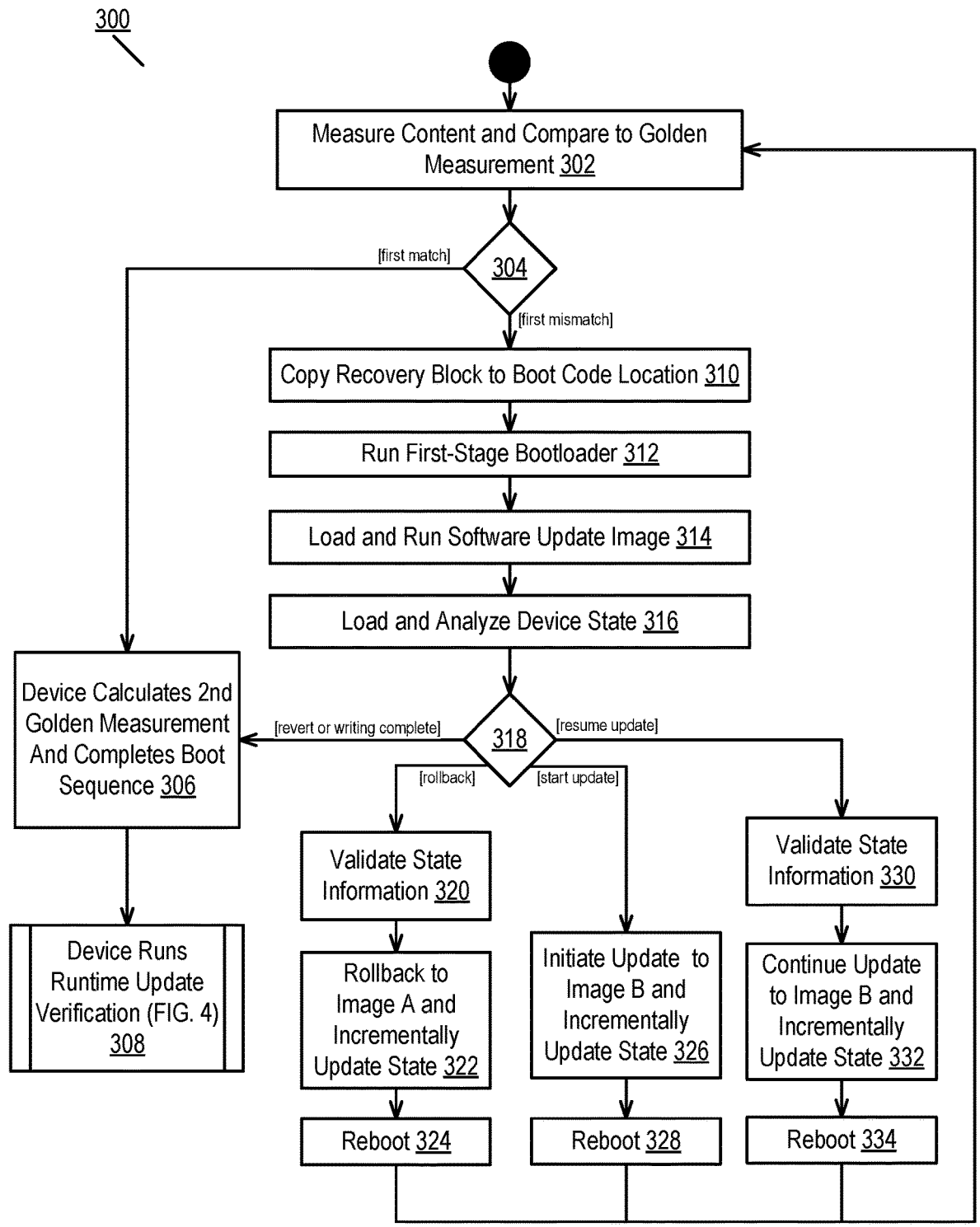
FIG. 3 is a flow diagram illustrating a method for executing a boot time sequence according to some embodiments of the disclosure.

FIG. 3 is a flow diagram illustrating a method for executing a boot time sequence according to some embodiments of the disclosure. The method (300) may be executed by a non-privileged user of a device. In the illustrated embodiment, the method (300) is performed at boot-time and is performed offline in a context that is considered secure because it much harder to hack. In contrast, the methods (400, 500) are executed at runtime and may be subject to interference by malicious actors. Thus, the methods (400, 500) are performed by a privileged user with access to a known key.

In block 302, the method (300) measures the content of the first portion to compute a first measurement for the first portion (also referred to as the software update source code image space in the description of block 202). As described above, this can be performed using a cryptographic function such as a hash function or similar function. The method (300) then compares this first measurement to the golden measurement for the first portion generated by the system in block 212 of FIG. 2. In essence, the method (300) determines whether the first-stage bootloader is valid.

In block 304, the method (300) determines if the first measurement generated in block 302 matches the golden measurement of the first portion (generated in block 212).

In block 306, if the method (300) determines that the first measurement matches the first golden measurement (i.e., the bootloader is valid), the method calculates a second golden measurement and completes the boot sequence.

In block 308, the method (300) runs a runtime update verification procedure after completing the boot sequence. The details of block 308 are provided in FIG. 4 which is incorporated herein and not repeated.

Generally, during a first reboot, the first golden measurement will not match with the FSBL and the method will proceed to block 310.

In block 310, the method (300), copies the recovery block to the boot code location. As described above, the recovery block comprises a pointer to the boot code location stored in the first portion.

In block 312, the method (300) runs the FSBL. In the illustrated embodiment, the FSBL initializes the system and returns a point to the software update image stored within the first portion.

In block 314, the method (300) loads and runs the software update image stored within the first portion. In one embodiment, the FSBL transfers control to the update software loaded in the first portion which then takes control of the processing described herein.

In block 316, the method (300) loads the state of the device upon executing the update software. In one embodiment, the state of the device refers to data stored in one or more non-volatile registers of the device. The present disclosure is not limited to a certain type of data. In one embodiment, the state may comprise an update counter that is automatically incremented at every power cycle. Alternatively, or in conjunction with the foregoing, the state information can include register data storing the various state permutations described herein. In some embodiments, the registers storing the state may comprise platform configuration registers.

In block 318, the method (300) analyzes the state of the device. As will be described, the state registers loaded in block 316 indicate the current state of any update or rollback operations executed prior to the reboot.

If the method (300) determines that a revert or update operation was completed during the last power cycle, the method continues the boot sequence in block 306 and ultimate runs the runtime update verification procedure in block 308. In this block, the method (300) successfully has updated the device (or rolled back) and operations can resume normally. As used in block 318, the update operation refers to the writing portion of the update operation described in blocks 322, 326, and 332.

In block 320, the method (300) validates the state information upon determining that the state information indicates a rollback operation is in progress. In the illustrated embodiment, a rollback operation indicates that the system should return to image A. In some embodiments, the method (300) measures the current status of the update and compares that measurement to the value stored within the register file. Upon detecting a match, the method (300) can proceed. If the method (300) detects a mismatch, the method (300) may end or preemptively restore the device.

In block 322, after validating the state information, the method (300) begins to roll back to the previous software image. In the illustrated embodiment, the method (300) executes this block by performing successive write operations on the active storage space using the data stored within the second portion. Simultaneously, the method (300) also updates the state information with the expected measurement of the software image after each successive write, thus ensuring that that rollback can proceed even in the event of power loss or other disruption.

In block 324, the method (300) reboots the device and the process may restart the method (300). In this scenario, if the method (300) fully rolls back the update, the decision in block 318 will branch to block 306. Alternatively, if the method (300) is interrupted mid-roll back, the method (300) will ultimately return to block 320 to continue the rollback.

Alternatively, the method (300) may determine that the state information indicates that an update should be initiated. In this scenario, in block 326, the method (300) initiates an update to an update image (Image B) and incrementally updates the state information. Similar to the operations described in block 322, the method (300) accesses the update image stored in the second portion and successively writes data to the third portion to update the software. Simultaneously, the method (300) also updates the state information with the expected measurement of the updated software image after each successive write, thus ensuring that that update can proceed even in the event of power loss or other disruption.

In block 328, the method (300) reboots the device after all writes have been performed and the method (300) restarts. Similar to that described with respect to block 324. If the update is completed, the method (300) will ultimate return to block 306. However, if the update is interrupted, the method (300) will ultimately branch to block 330 to resume the update.

In block 330, the method (300) validates the state information upon determining that the state information indicates an update operation is in progress. In some embodiments, the method (300) measures the current status of the update and compares that measurement to the value stored within the register file. Upon detecting a match, the method (300) can proceed. If the method (300) detects a mismatch, the method (300) may end or preemptively restore the device.

In block 332, the method (300) continues update to an update image (Image B) and incrementally updates the state information. Similar to the operations described in blocks 322 and 326, the method (300) accesses the update image stored in the second portion and successively writes data to the third portion to update the software. Simultaneously, the method (300) also updates the state information with the expected measurement of the updated software image after each successive write, thus ensuring that that update can proceed even in the event of power loss or other disruption.

In block 334, the method (300) reboots the device after all writes have been performed and the method (300) restarts. This process is performed similar to that described in the reboot performed in block 328, to ensure that a resumed update is not stopped due to a power loss.

Figure 4:
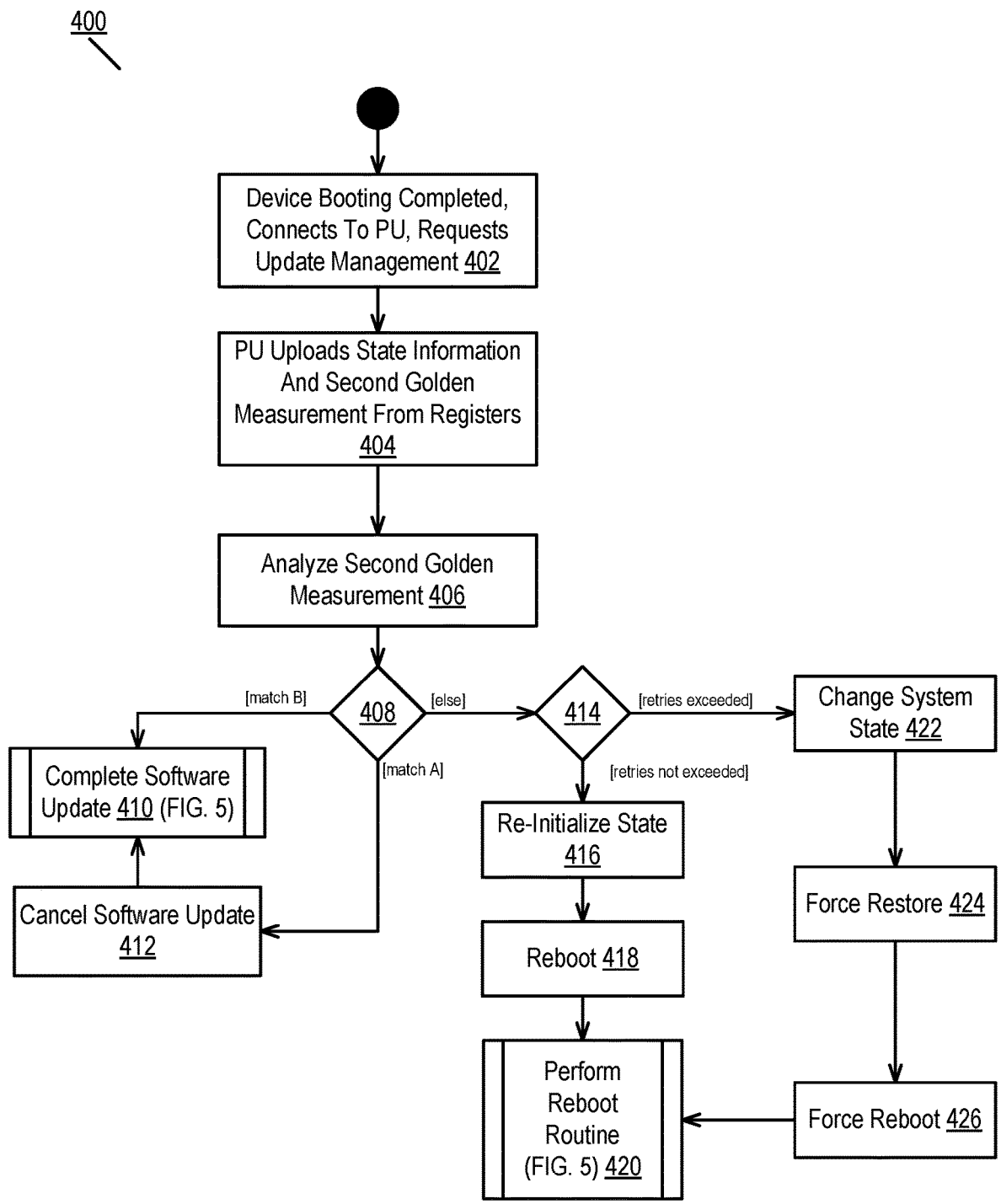
FIG. 4 is a flow diagram illustrating a method for executing a runtime management update according to some embodiments of the disclosure.

FIG. 4 is a flow diagram illustrating a method for executing a runtime management update according to some embodiments of the disclosure. In the illustrated embodiment, the method (400) may be performed by a privileged user of a device.

In block 402, device booting has completed, the method connects to a privileged user, and requests update management operations. In some embodiments, the privileged user comprises a remote user.

In block 404, the privileged user uploads state information and the second golden measurement from device registers to a remote server. In some embodiments, this information comprises information generated by the device during the boot sequence includes the golden measurements and the contents of registers. In some embodiments, the information is only transmitted to the remote server if an update is needed. In some embodiments, information is only transmitted if the method (400) determines that the updates image has been completely written but the remainder of the method (400) has not been executed. This enables a reboot after writing but before the update in method (400) has completed.

In block 406, the method (400) compares a second measurement generated during boot (of the second portion, alternatively referred to as the "software update buffer space" as described in block 206) to the second golden measurement. In other words, in block 310 the method compares the second measurement of the second portion to the second golden measurement associated with an update image and the second golden measurement associated with a previous image. The update image and previous image are referred to as images B and A, respectively.

In block 408, the method (400) compares the second measurement to the golden measurement of the update image (the image stored in the second portion) and the golden measurement of the previous image (the image cached from the second portion). In block 408, the method (400) determines if the computed matches image A, image B, or another value. The golden measurement for the current second portion is referred to as golden measurement B while the golden measurement for the cached second portion is referred to as golden measurement A. As described above, the second measurement refers to a hash of the update image itself. Thus, the method (400) compares the value of the update data to apply to the existing known golden measurements. In the illustrated embodiment, the second measurement refers to the measurement of the second portion performed at boot time.

In block 410, the method completes the update procedure upon determining that the second measurement matches the golden measurement for image B (the update image). In this scenario, the update was completed successfully and the expected update image contents are in the active storage space. Thus, the method (400) can securely complete the update procedure which is described in more detail in FIG. 5.

In block 412, the method (400) determines that the second measurement matches golden measurement A (associated with the previous image A). In this scenario, the method (400) cancels the current update then completes the software update by verifying that the software was restored to the state prior to initiating the update. In this scenario, the method (400) has reverted to the previous image (e.g., via a roll back operation performed in blocks 320, 322, 324). Thus, the method (400) cancels the update procedure (i.e., by updating the state registers) and proceeds to end the complete the procedure in FIG. 5.

If the second measurement does not match second golden measurement A or B, the method (400) proceeds to block 414. In block 414, the method (400) determines that the active storage space include potentially corrupted data. However, the method (400) first determines whether a number of update retries has been met. As described above, a counter may be used to control the number of update attempts before signaling a failure. Notably, while the method described in FIG. 3 ultimately results in either Image A or Image B being written to the active storage space, a malicious user may intercept the update procedure and write another image to the active storage space after block 306. Thus, the decision in block 414 prevents this hijacking.

In block 416, the method (400) re-initializes the system state to force a restart of the update sequence. As described herein, the secure device includes one or more registers that store the state of the device persistently between reboots. In block 416, the method (400) modifies this system state to indicate that the device should restart at block 502 of FIG. 5 with an initialized state. The method (400) then reboots the device (418) and proceeds to perform the reboot routine (block 420) described in FIG. 5.

In block 422, the method (400) detects a corrupted state and changes the system state accordingly. In one embodiment, the method (400) modifies the system registers to indicate that a rollback operation should occur. Details regarding a rollback operation are provided in FIG. 5. Next, the method (400) forces a system restore (424). The method (400) then forces a reboot (block 426) of the secure device to effectuate the system restore. After rebooting, the method (400) then performs the reboot routine (block 420) described in FIG. 5.

Figure 5:
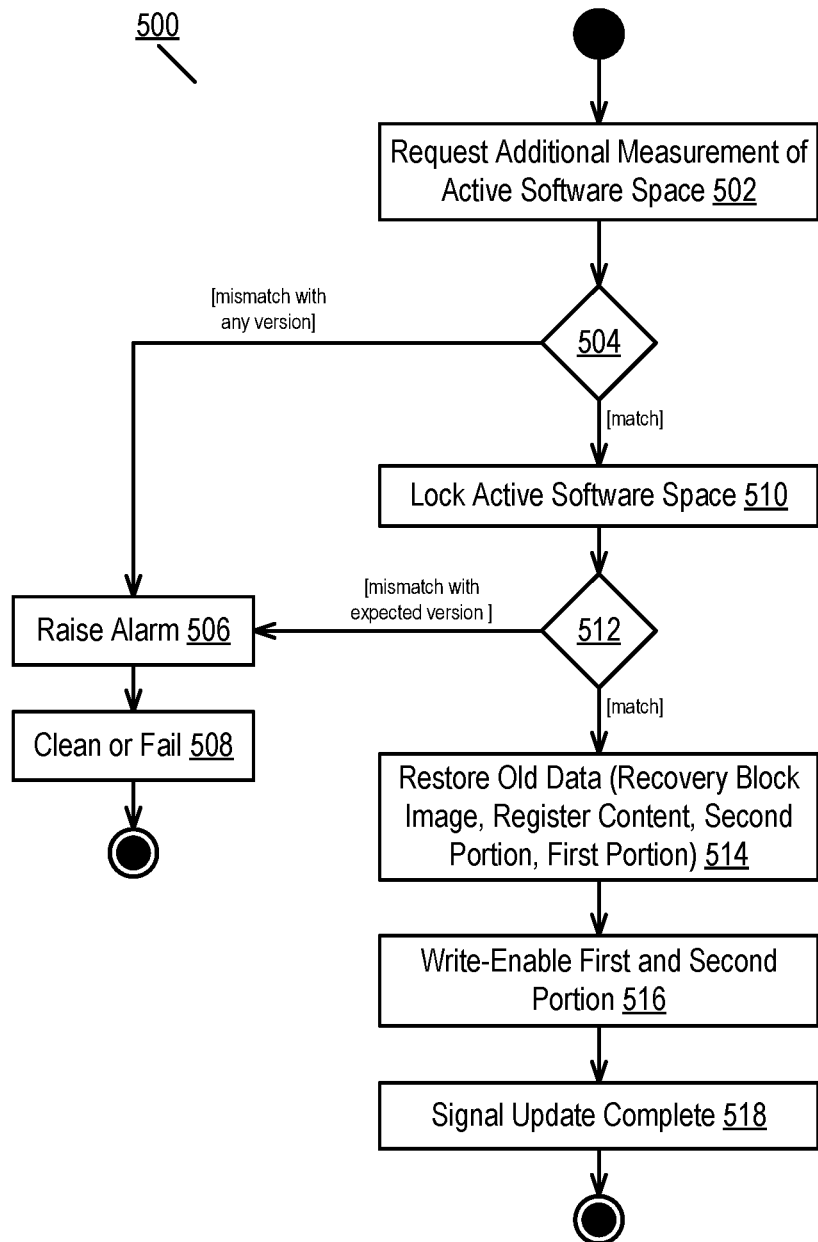
FIG. 5 is a flow diagram illustrating a method for completing a software update according to some embodiments of the disclosure.

FIG. 5 is a flow diagram illustrating a method for completing a software update according to some embodiments of the disclosure. In the illustrated embodiment, the method (500) may be performed by a privileged user of the device.

In block 502, the method (500) requests an additional measurement of the active storage space of the secure storage device. As described above, this measurement can comprise a cryptographic measurement of the active storage space.

In block 504, the method (500) compares the additional measurement to both the golden measurements for the previous software image and the updated software image. If the additional measurement does not match the desired golden measurement (based on the decision to update or revert), the method (500) proceeds to block 506.

In block 506, the method (500) raises an alarm. The specific details of an alarm are not intended to be limiting and any technique for raising an alarm in response to a corrupted state may be used. For example, the method (500) may notify a third-party that the active storage space is not in a valid state. Alternatively, or in conjunction with the foregoing, the method (500) can alert a user regarding the same.

In block 508, the method (500) then can clean the device or, in some embodiments, fail. In one embodiment, the method (500) can clean a device by formatting the relevant portions of the secure storage device to prevent operation of the device. In other embodiments, the method (500) may simply power off the device or otherwise fail gracefully. After executing block 508, the method (500) ends.

In block 510, the method (500) locks the active storage space in response to determining that the additional measurement matches the desired golden measurement. In one embodiment, locking the active storage space is perform using a known cryptographic key.

In block 512, after locking the active storage space, the method (500) requests a second, additional measurement of the active storage space of the secure storage device. As described above, this second measurement can comprise a cryptographic measurement of the active storage space. The method (500) then compares the second additional measurement to both the golden measurements for the previous software image and the updated software image. If the additional measurement does not match the desired golden measurement (based on the decision to update or revert), the method (500) proceeds to blocks 506 and 508. Blocks 506 and 508 were described previously and that description is not repeated herein.

In blocks 514 and 516, the method (500) restores the previously stored data in memory to its original location. In the illustrated embodiment, this previously stored data includes the recovery block image, register content, and the contents of the first and second portions of the secure storage device. In one embodiment, when restoring the previous contents of the first and second portions of the secure storage device, the method (500) configures the first and second portions to be write-enabled.

In block 518, the method (500) signals a completed update. In some embodiments, signaling a completed update may comprise booting the device using the new software image. Alternatively, or in conjunction with the foregoing, the method (500) may generate an external signal indicating that the device is updated and ready for operation.

Figure 6:
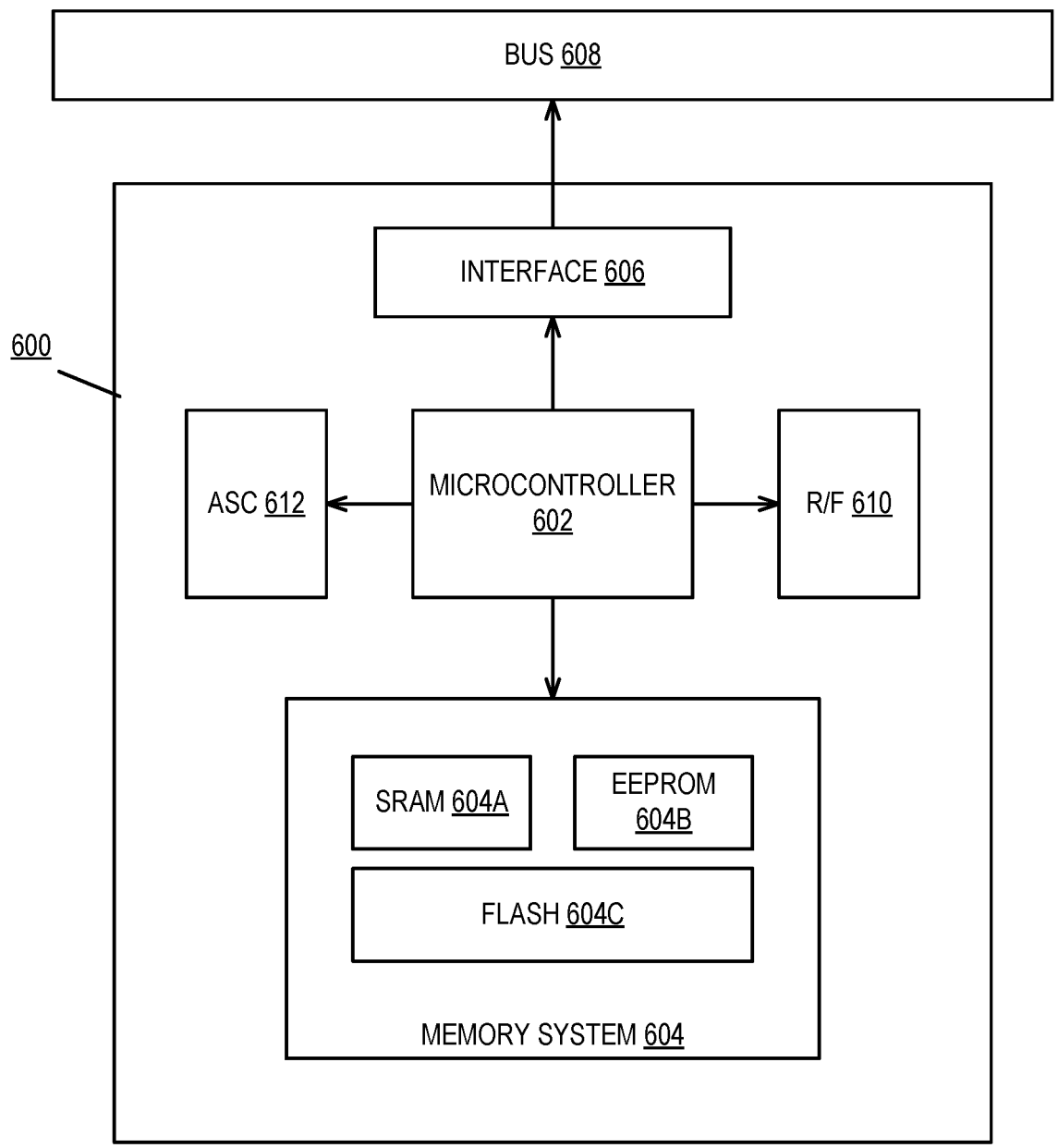
FIG. 6 is a block diagram of a computing device according to some embodiments of the disclosure.

FIG. 6 is a block diagram of a computing device according to some embodiments of the disclosure.

In the illustrated embodiment, a computing device (600) is communicatively coupled to a bus (608) via an interface (606). The bus (608) may comprise an Ethernet, Controller Area Network (CAN), FlexRay, Media Oriented Systems Transport (MOST) bus or similar type of bus. Correspondingly, the interface (606) may comprise a similar interface for accessing the specific type of bus used.

The computing device (600) additionally includes a microcontroller (602), R/F subsystem (610), application-specific components (ASC) (612) and memory system (604). In the illustrated embodiment, the microcontroller (602) can comprise a processor or smaller microcontroller configured to control operations of the computing device (600). In some embodiments, the microcontroller (602) accesses program instructions stored in the memory system (604) and, according to those instructions, drives ASC (612). Examples of ASC (612) include peripheral devices and other use-specific (e.g., automotive) devices. The types of ASCs employed by the computing device (600) are not limiting and any type of ASCs may be employed by the computing device (600).

The computing device (600) additionally includes an R/F system (610). In the illustrated embodiment, the R/F system (610) may include one or more radios or transceivers for communicating with wireless networks. R/F system (610) may include Bluetooth, Wi-Fi or cellular radios or satellite transceivers. In some embodiments, R/F system (610) includes a combination of radios or transceivers. In some embodiments, computing device (600) may not include an R/F system (610) and may instead utilize a vehicle-wide R/F system, as described previously.

Microcontroller (602) manages memory system (604). In the illustrated embodiment, the memory system (604) can comprise a secure storage device as described previously. In the illustrated embodiment, memory system (604) includes SRAM (604a), EEPROM (604b), and Flash storage (604c). In the illustrated embodiment, SRAM (604a) may be utilizes as an L1 or L2 cache for microcontroller (602). Similarly, EEPROM (604b) may be used as firmware storage for the computing device (600). The specific details (or presence) of SRAM (604a) and EEPROM (604b) is not limiting.

Memory system (604) additionally includes a Flash storage device (604c). In the illustrated embodiment, the Flash storage device (604c) comprises a NAND Flash storage device soldered to a PCB and connected (via the PCB) to the other components depicted in FIG. 6. Flash storage device (604c) is utilized to storage operating code as well as data used by the computing device (600) as described previously.

Figure 7:
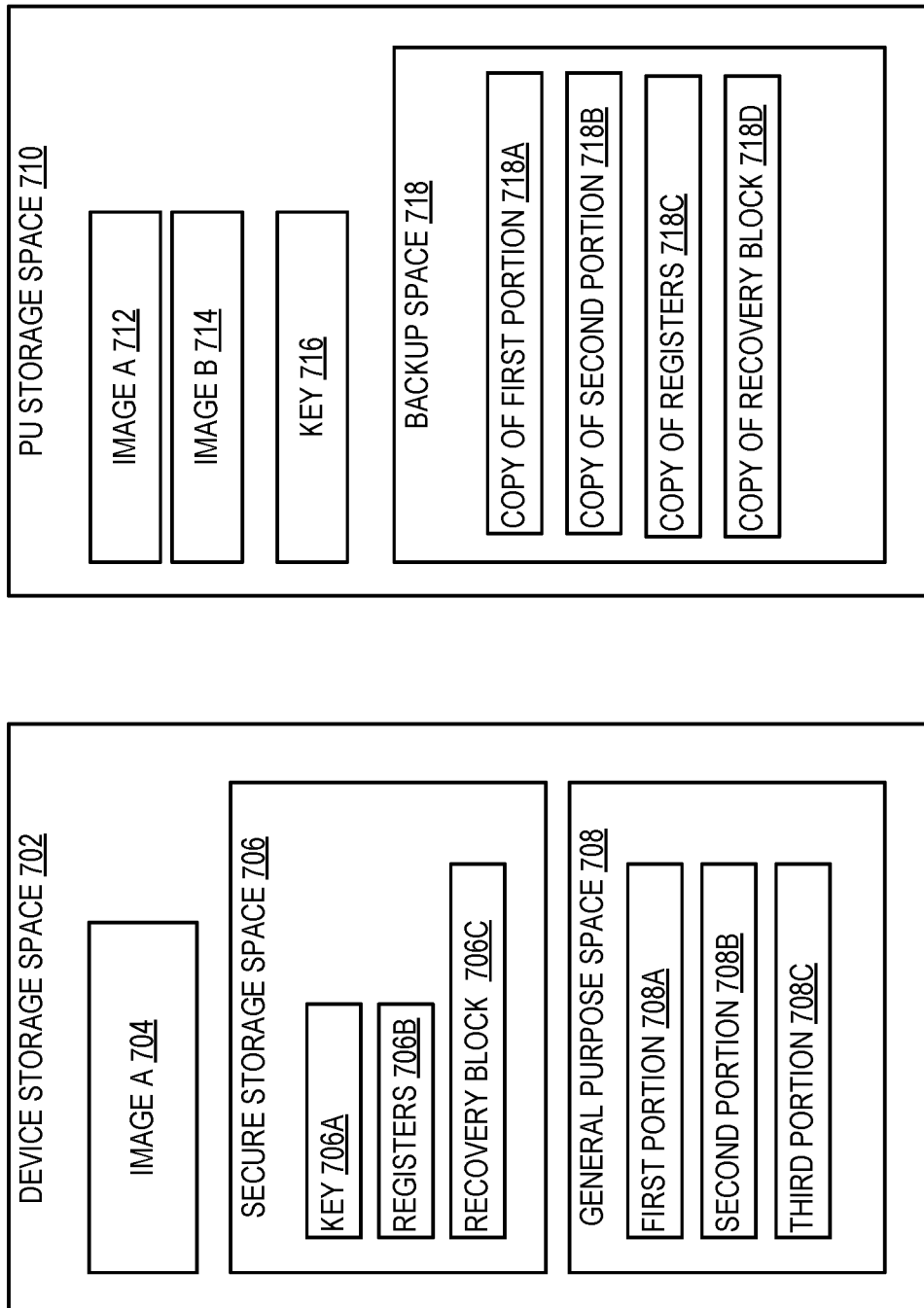
FIG. 7 is a block diagram of a layout of a storage device according to some embodiments of the disclosure.

FIG. 7 is a block diagram of a layout of a storage device according to some embodiments of the disclosure.

In the illustrated storage system (700), there exist two logical storage spaces: a device storage space (702) and a privileged user (PU) storage space (710). In general, space (702) is by default accessible to any non-privileged users while the space (710) is only accessible by the privileged user.

The device storage space (702) includes an active software image (image A, 704). This image (704) may comprise the currently executing software on the device. Additionally, the device storage space (702) includes a secure storage space (706) that includes a cryptographic key (706a), a set of registers (706b), and a recovery block (706c). In one embodiment, the secure storage space (706) is cryptographically secured such that only a user (e.g. privileged user) can access the secure storage space (706) with an established key. Finally, the device storage space (702) includes a general-purpose space (708) that includes a first portion (708a), second portion (708b), and third portion (708c). In general, the general-purpose space (708) is accessible by privileged and non-privileged users and may be configured to be write protected as needed. When write-protected, only privileged users can modify the contents of the write-protected portions.

The PU storage space (710) comprises a secure storage area accessible only by the privileged user. The PU storage space (710) can include a copy of the original image A (712) as well as an update image B (714). Additionally, the PU storage space (710) includes a cryptographic key (716) that is used to access secure storage space (706) as well as any write-protected portions (708a, 708b). Additionally, the PU storage space (710) includes a backup space (718). This backup space (718) comprises a storage portion that can be used to back up copies of the first portion (718a), second portion (718b), registers (718c), and recovery block (718d) as described in the foregoing figures.

The present disclosure has been described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used above may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a general-purpose processor, a special-purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

What is claimed is:

1. A method comprising:
    loading a first golden measurement of a computing device, the first golden measurement generated during an offline mode of the computing device, the first golden measurement corresponding to an update image;
    loading a second golden measurement of a computing device, the second golden measurement corresponding to a previous software image;
    calculating a boot time measurement by analyzing a software image;
    canceling an update operation when the boot time measurement matches the second golden measurement;
    performing an update operation when the boot time measurement matches the first golden measurement; and
    rebooting the computing device when the boot time measurement matches neither the first nor second golden measurement.

2. The method of claim 1, further comprising uploading state information and the golden measurement to a remote server.

3. The method of claim 1, wherein canceling an update operation further comprises restoring the computing device to the previous software image.

4. The method of claim 1, wherein performing an update operation comprises:
    performing an additional measurement of an active software space;
    confirming that the additional measurement matches the first golden measurement; and
    locking the active software space.

5. The method of claim 4, wherein performing an update operation further comprises:
performing a second additional measurement of the active software space after locking the active software space;
confirming that the second additional measurement matches the first golden measurement; and
completing the update operation.

6. The method of claim 1, wherein canceling an update operation comprises determining that a number of retries has exceeded a threshold; forcing a system restore of the computing device; and rebooting the computing device.

7. The method of claim 1, wherein canceling an update operation comprises determining that a number of retries has not exceeded a threshold; re-initializing a system state of the computing device; and rebooting the computing device.

8. A non-transitory computer-readable storage medium for tangibly storing computer program instructions capable of being executed by a computer processor, the computer program instructions defining steps of:
loading a first golden measurement of a computing device, the first golden measurement generated during an offline mode of the computing device, the first golden measurement corresponding to an update image;
loading a second golden measurement of a computing device, the second golden measurement corresponding to a previous software image;
calculating a boot time measurement by analyzing a software image;
canceling an update operation when the boot time measurement matches the second golden measurement;
performing an update operation when the boot time measurement matches the first golden measurement; and
rebooting the computing device when the boot time measurement matches neither the first nor second golden measurement.

9. The non-transitory computer-readable storage medium of claim 8, the steps further comprising uploading state information and the golden measurement to a remote server.

10. The non-transitory computer-readable storage medium of claim 8, wherein canceling an update operation further comprises restoring the computing device to the previous software image.

11. The non-transitory computer-readable storage medium of claim 8, wherein performing an update operation comprises:
performing an additional measurement of an active software space;
confirming that the additional measurement matches the first golden measurement; and
locking the active software space.

12. The non-transitory computer-readable storage medium of claim 11, wherein performing an update operation further comprises:
performing a second additional measurement of the active software space after locking the active software space;
confirming that the second additional measurement matches the first golden measurement; and
completing the update operation.

13. The non-transitory computer-readable storage medium of claim 8, wherein canceling an update operation comprises determining that a number of retries has exceeded a threshold; forcing a system restore of the computing device; and rebooting the computing device.

14. The non-transitory computer-readable storage medium of claim 8, wherein canceling an update operation comprises determining that a number of retries has not exceeded a threshold; re-initializing a system state of the computing device; and rebooting the computing device.

15. A device comprising:
a processor; and
a storage medium for tangibly storing thereon program logic for execution by the processor, the stored program logic comprising instructions causing the processor to perform operations of:
loading a first golden measurement of a computing device, the first golden measurement generated during an offline mode of the computing device, the first golden measurement corresponding to an update image;
loading a second golden measurement of a computing device, the second golden measurement corresponding to a previous software image;
calculating a boot time measurement by analyzing a software image;
canceling an update operation when the boot time measurement matches the second golden measurement;
performing an update operation when the boot time measurement matches the first golden measurement; and
rebooting the computing device when the boot time measurement matches neither the first nor second golden measurement.

16. The device of claim 15, the operations further comprising uploading state information and the golden measurement to a remote server.

17. The device of claim 15, wherein canceling an update operation further comprises restoring the computing device to the previous software image.

18. The device of claim 15, wherein performing an update operation comprises:
performing an additional measurement of an active software space;
confirming that the additional measurement matches the first golden measurement;
locking the active software space;
performing a second additional measurement of the active software space after locking the active software space;
confirming that the second additional measurement matches the first golden measurement; and
completing the update operation.

19. The device of claim 15, wherein canceling an update operation comprises determining that a number of retries has exceeded a threshold; forcing a system restore of the computing device; and rebooting the computing device.

20. The device of claim 15, wherein canceling an update operation comprises determining that a number of retries has not exceeded a threshold; re-initializing a system state of the computing device; and rebooting the computing device.

* * * * *